United States Patent Office 3,418,327
Patented Dec. 24, 1968

1

3,418,327
5-ALKYL-13-POLYCARBON-GONENES
George C. Buzby, Jr., Philadelphia, and Herchel Smith, Wayne, Pa., assignors to American Home Products Corporation New York, N.Y., a corporation of Delaware
No Drawing. Filed Mar. 22, 1966, Ser. No. 536,304
5 Claims. (Cl. 260—397.4)

ABSTRACT OF THE DISCLOSURE

Gon-4,9-dien-3-ones are converted to the corresponding 5-methylgon-9-enes, 9-methylgon-4-enes, and 3-methylgon-1,3,5(10)-trienes, which possess an anti-androgenic activity, by addition of Grignard reagent at the 4,5-unsaturation, the 9,10-unsaturation, and the 3-position, respectively. The three products are separated by chromatographic techniques.

This invention relates to compositions of matter classified in the art of chemistry as substituted unsaturated gonenes.

The invention sought to be patented in its principal composition aspect is described as residing in the concept of a 17-hydroxy-5-lower alkyl-13-lower polycarbon-alkylgon-9-ene.

The tangible embodiments of the principal composition aspect of the invention possess the inherent general aspect of being white crystalline solids, are substantially insoluble in water, and are generally soluble in polar solvents such as dimethyl acetamide. Examination of compounds produced according to the hereinafter described process reveals upon infrared, ultraviolet, and nuclear magnetic resonance spectra analysis, spectral data supporting the molecular structure hereinbefore set forth. For example, the 5-alkyl group is evident in the nuclear magnetic resonance. The aforementioned physical characteristics, taken together with the elemental analysis, the nature of the starting materials and the mode of synthesis, confirm the structures of the compositions sought to be patented.

The tangible embodiments of the first composition aspect of the invention possess the inherent applied use characteristic of exerting an anti-androgenic effect in animals as evidenced by pharmacological evaluation according to standard test procedures. This finding indicates potential interest for the treatment of anti-androgenic syndromes.

The invention sought to be patented in a second composition aspect is described as residing in the concept of a 17-hydroxy-9-lower alkyl-13-lower polycarbon-alkylgon-4-ene.

The tangible embodiments of the second composition aspect of the invention possess the inherent general aspect of being white crystalline solids, are substantially insoluble in water, and are generally soluble in polar solvents such as dimethylacetamide. Examination of compounds produced according to the hereinafter described process reveals upon infrared, ultraviolet, and nuclear magnetic spectra analysis, special data supporting the molecular structure hereinbefore set forth. For example, the change in unsaturation from 4,9 to 4 is evident in the ultraviolet. The aforementioned physical characteristics, taken together with the nature of the starting materials and the mode of synthesis, confirm the structures of the compositions sought to be patented.

The tangible embodiments of the second composition aspect of the invention possess the inherent applied use characteristic of exerting an anabolic effect in animals as evidenced by pharmacological evaluation according to standard test procedures.

The invention sought to be patented in a third composition aspect is described as residing in the concept of a 17-hydroxy-3-lower alkyl-13-lower polycarbon alkylgon-1,3,5(10)-triene.

The tangible embodiments of the tihrd composition aspect of the invention possess the inherent general physical properties of being white crystalline solids, are substantially insoluble in water, and are generally soluble in polar solvents such as dimethyl acetamide. Examination of compounds produced according to the hereinafter described process reveals upon infrared and nuclear magnetic resonance spectra analysis, spectral data supporting the molecular structure hereinbefore set forth. For example, the 3-alkyl group is evident in the nuclear magnetic resonance and the aromatic A-ring is evident in the ultraviolet. The aforementioned physical characteristics, taken together with the elemental analysis, the nature of the starting materials and the mode of synthesis, confirm the structure of the compositions sought to be patented.

The tangible embodiments of the invention possess the inherent applied use characteristic of exerting a lipid-lowering effect in animals as evidenced by pharmacological evaluation according to standard test procedures.

The process of making a specific embodiment of the compositions of the invention is illustrated schematically as follows:

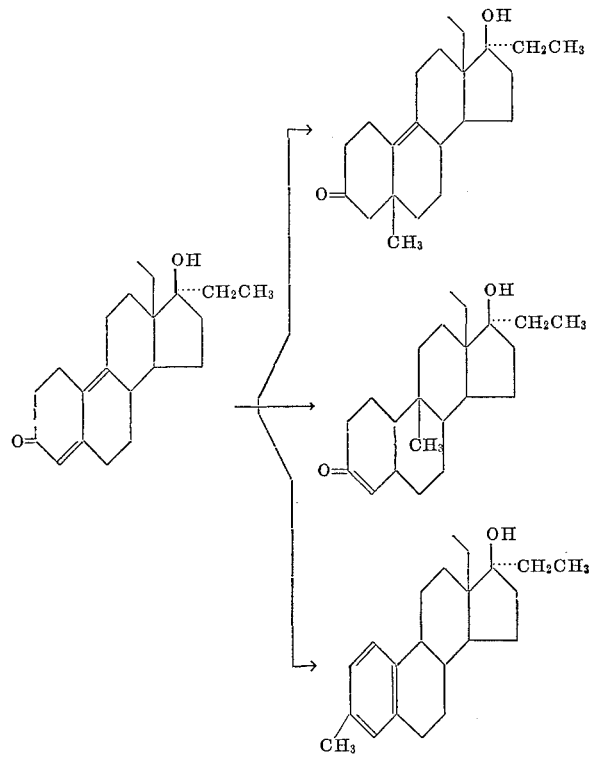

The manner of making the compositions of the invention will now be described so as to enable a person skilled in the art of chemistry to make and use the same as follows:

The 13β-polycarbon-alkylgona-4,9-dienes which are employed as starting materials for the preparation of the compounds of the invention are prepared as described in co-pending U.S. application Ser. No. 194,972 filed May 15, 1962.

Addition of an excess of a lower alkyl Grignard reagent in the presence of cuprous chloride to a 13β-polycarbon-alkylgona-4,9-diene gives after decomposition of the Grignard adduct, and isolation of the organic materials, a gummy residue. From this residue when it is subjected to gradient elution chromatography there is obtained three products; namely, the 5-methylgon-9-ene resulting from the addition of the Grignard across the 4,5-unsaturation, the 9-methylgon-4-ene resulting from addition of the Grignard across the 9,10-unsaturation, and the 3-methylgon-1,3,5(10)-triene from addition to the 3-position, followed by aromatization. The reaction is preferably carried out at temperatures about −15° to about −20° in a solvent such as anhydrous tetrahydrofuran. The chromatographic separation is carried out according to conventional procedures preferably on "Florex."

It will be apparent from the disclosure herein to those skilled in the art of organic chemistry that for the purposes of the invention certain of the atoms of the gona-4,9-diene starting material can be substituted with groups which do not interfere with the subsequent reaction. Thus, the 13-polycarbon lower-alkyl can be, for example, but without limiting the generality thereof, ethyl, propyl, butyl, or isobutyl. The 17-position may be substituted with hydroxy and an ethyl group as illustrated above, or it may be a 17-hydroxy-17-hydrogen, or 17-hydroxy-17-lower-alkyl other than ethyl, such as methyl, propyl, butyl; 17-hydroxy-17-lower-alkenyl, such as vinyl; or 17-hydroxy-17-lower-alkynyl, such as ethynyl. The starting materials can also be substituted with an alkyl group such as methyl or ethyl at the 6- and 7- positions.

The lower alkyl Grignard used as starting material can be methyl, or it can be, for example, but without limiting the generality thereof, ethyl, propyl, butyl, or isobutyl.

When the starting compounds are substituted as hereinbefore recited it will be apparent herefrom to those skilled in the art of chemistry that the product will bear correspondingly the same substituents. Therefore for the purpose of this invention, the compositions produced in their inherent use are the full equivalents of the invention as particularly claimed.

While the tetracyclic compounds in this specification and the appended example are named to describe the configuration corresponding to the natural steroids, it is to be understood that unless otherwise indicated the racemate is intended which contains solid named compounds and its enantiomorph.

The compositions of the invention can be formulated as solid capsules, tablets, etc., by combining with conventional carriers. The effective dosage depends upon the particular compound used and the characteristics of the case and can be determined by conventional methods. Generally a dosage range of from 0.10 to about 15 mg. per kilogram of body weight per day represents the overall range.

The following examples illustrate the best mode contemplated by the inventors of making the compositions of the invention:

EXAMPLE 1

Add 13-ethyl-17β-hydroxy-4,9-dien-3-one (2.8 g.) in dry tetrahydrofuran (25 ml.), dropwise to a suspension of 3 M methyl magnesium bromide (30 ml.) and cuprous chloride (1.0 g.) in dry tetrahydrofuran (150 ml.) at −18° C. with vigorous mechanical stirring. Continue stirring for one-half hour after the addition is complete. Pour the reaction mixture into cold brine saturated with concentrated hydrochloric acid. Extract with ether, wash the combined ether extracts with water, dry over magnesium sulfate, and evaporate the solvent under reduced pressure. Subject the gummy residue to gradient elution chromatography on "Florex" (100 g.). Three products are obtained, as follows:

(1) 13 - ethyl - 17β - hydroxy-5-methylgon-9-en-3-one (0.165 g.) (from ether); M.P. 153–155.5°;

$\lambda_{max.}^{KBr}$ 3.0, 5.87; $\lambda_{max.}^{EtOH}$ no absorption above 220 mµ

Analysis for $C_{20}H_{30}O_2$: calculated: C, 79.42; H, 10.00%. Found: C, 79.00; H, 10.04%.

(2) 13 - ethyl - 17β-hydroxy-3-methylgona-1,3,5(10)-trien (0.435 g.); M.P. 126–129° from methanol;

$\lambda_{max.}^{KBr}$ 3.07, 6.15, 9.50µ; $\lambda_{max.}^{EtOH}$ 264 mµ (ε 5,400)

Analysis for $C_{20}H_{28}O$: calculated: C, 84.43; H, 9.92%. Found: C, 84.15; H, 9.67%.

(3) 13 - ethyl - 17β - hydroxy-9-methylgon-4-en-3-one (0.08 g.) (from ether); M.P. 188–190°;

$\lambda_{max.}^{KBr}$ 3.01, 6.09µ; $\lambda_{max.}^{EtOH}$ 245 mµ (ε 15,825)

Nuclear magnetic resonance shows a methyl peak at 0.91 p.p.m.

EXAMPLE 2

By the above procedure, employing 13,17α-diethyl-17β-hydroxygona-4,9-dien-3-one and methyl magnesium bromide as starting materials, there is obtained:

(1) 13,17α - diethyl - 17β - hydroxy-5-methylgon-9-en-3-one; M.P. 157–161°;

$\lambda_{max.}^{KBr}$ 2.94, 5.87µ

UV shows no selective absorption above 210 mµ.

Analysis for $C_{22}H_{34}O_2$: calculated: C, 79.95; H, 10.37%. Found: C, 79.82; H, 10.66%.

(2) 13,17α - diethyl - 17β - hydroxy-3-methylgona-1,3,5(10)-triene (from methanol); M.P. 127–128°;

$\lambda_{max.}^{KBr}$ 3.0µ; $\lambda_{max.}^{EtOH}$ 262 mµ (ε 4,650)

Analysis for $C_{22}H_{32}O$: calculated: C, 84.56; H, 10.32%. Found: C, 84.84; H, 10.22%.

(3) 13,17α - diethyl - 17β - hydroxy-9-methylgon-4-en-3-one (from acetonitrile); M.P. 158°;

$\lambda_{max.}^{KBr}$ 2.9, 6.04, 6.20µ; $\lambda_{max.}^{EtOH}$ 248 mµ (ε 16,400)

The subject matter which the applicants regard as their invention is particularly pointed out and distinctly claimed as follows:

1. 13-ethyl-17β-hydroxy-5-methylgon-9-en-3-one.
2. 13 - ethyl - 17β - hydroxy - 3-methylgona-1,3,5(10)-triene.
3. 13-ethyl-17β-hydroxy-9-methylgon-4-en-3-one.
4. 13,17-diethyl-17β-hydroxy-5-methylgon-9-en-3-one.
5. 13,17 - diethyl - 17β - hydroxy - 3 - methylgona-1,3,5(10)-triene.

No references cited.

HENRY A. FRENCH, *Primary Examiner.*

U.S. Cl. X.R.

260—397.45, 397.5; 167—65, 74